United States Patent [19]

Fischer

[11] Patent Number: 4,518,015

[45] Date of Patent: May 21, 1985

[54] INFLATABLE PLUG

[75] Inventor: William H. Fischer, Wingdale, N.Y.

[73] Assignee: The Presray Corporation, Pawling, N.Y.

[21] Appl. No.: 621,145

[22] Filed: Jun. 18, 1984

Related U.S. Application Data

[63] Continuation of Ser. No. 351,905, Feb. 24, 1982, abandoned.

[51] Int. Cl.³ .............................................. F16L 55/12
[52] U.S. Cl. ................................................... 138/93
[58] Field of Search ............................ 138/90, 93, 97;
152/158 S, 330 R, 333, 349, 350, 352 R;
166/192; 182/128, 223; 220/225, 232, 239, 85
B, 218; 277/34, 34.3

[56] References Cited

U.S. PATENT DOCUMENTS

| | | | |
|---|---|---|---|
| 1,181,984 | 5/1916 | Arni | 138/90 |
| 1,258,402 | 3/1918 | Garner | 182/128 X |
| 2,431,897 | 12/1947 | Wensley | 152/330 R |
| 2,912,033 | 11/1959 | Neisler, Jr. et al. | 152/330 R X |
| 2,927,609 | 3/1960 | Vander Lans | 220/232 X |
| 3,036,342 | 5/1962 | Fino | 220/222 |
| 3,289,788 | 12/1966 | Evans et al. | 182/223 |
| 3,339,931 | 9/1967 | Hundt et al. | 220/232 X |
| 3,343,708 | 9/1967 | Haas | 220/225 |
| 3,618,639 | 11/1971 | Daley et al. | 138/97 |
| 3,915,197 | 10/1975 | Piccirilli | 138/97 |
| 3,946,761 | 3/1976 | Thompson et al. | 138/93 X |
| 4,083,384 | 4/1978 | Horne et al. | 138/93 |
| 4,293,017 | 10/1981 | Lambe | 152/349 X |

FOREIGN PATENT DOCUMENTS

| | | | |
|---|---|---|---|
| 1081523 | 12/1954 | France | 220/225 |
| 13611 | of 1909 | United Kingdom | 138/93 |
| 412676 | 7/1934 | United Kingdom | 138/93 |

Primary Examiner—Stephen Marcus
Assistant Examiner—Mark Thronson
Attorney, Agent, or Firm—Mandeville & Schweitzer

[57] ABSTRACT

A novel inflatable plug for interrupting fluid flow in a pipe is provided which effects a stable, rigid seal while at the same time has a minimal axial length so as to be easily maneuverable. The plug is made from flexible, impermeable fabric and is provided with finely distributed, flexible inelastic connector elements or threads running in the axial direction and secured to opposed walls. When the plug is inflated, the threads prevent the opposed walls from separating a greater distance than the length of the threads. A complete plug assembly is also disclosed, comprising three such plugs in series, mounted on a bracing support frame and provided with a fail-safe inflation system.

10 Claims, 5 Drawing Figures

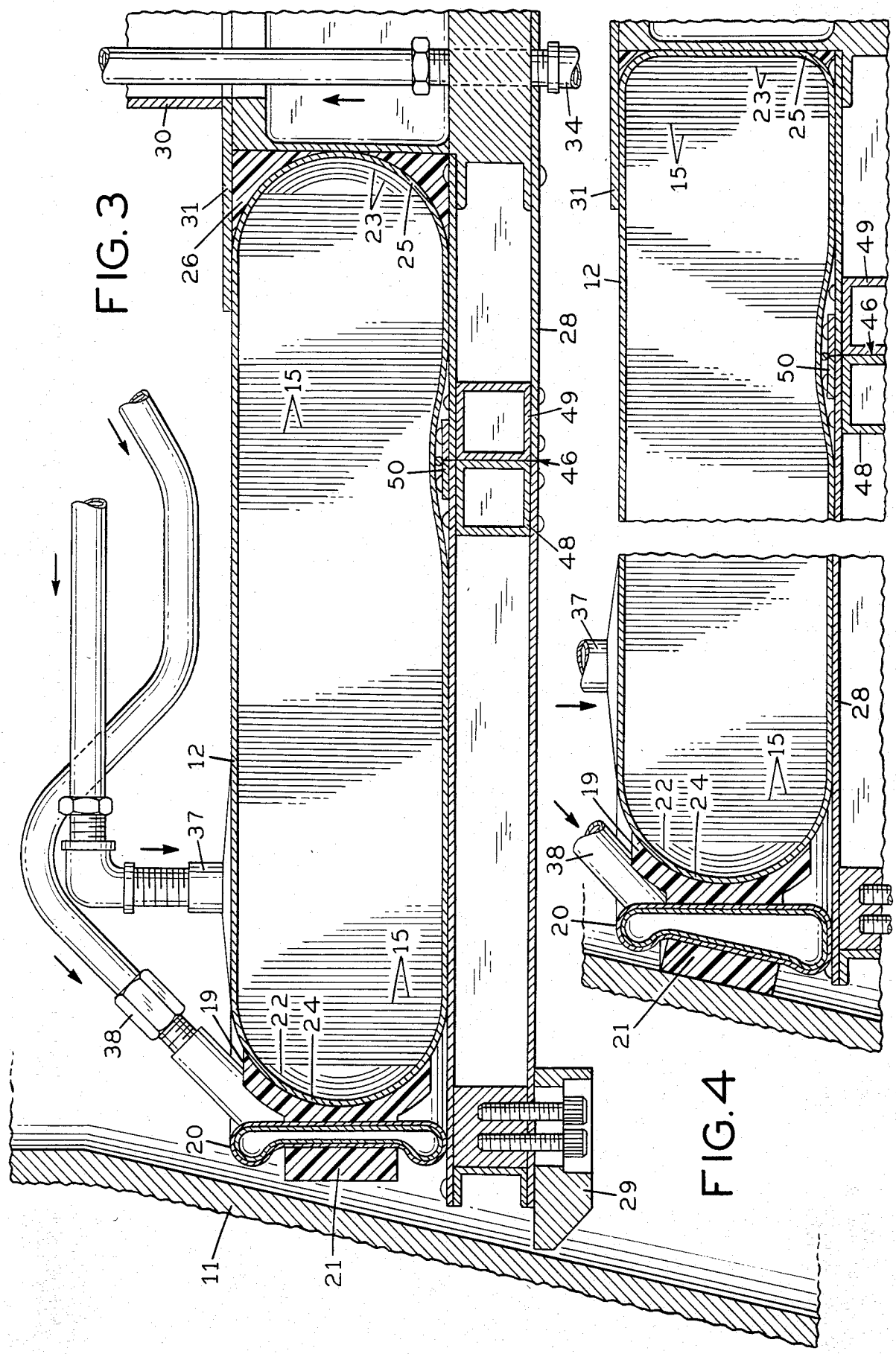

INFLATABLE PLUG

This is a continuation of application Ser. No. 351,905, filed Feb. 24, 1982, abandoned.

BACKGROUND OF THE INVENTION

When maintenance is performed on any machine or apparatus incorporating pipes, there is frequently the need to plug a pipe while work is being performed upstream or downstream of the plug. The plug would then act to hold back a head of water and would prevent any debris or other foreign objects from passing through the pipe into another section of the apparatus. The large scale pipes used in nuclear power plants are known to require such maintenance.

Typically, a plug will be inserted through a manway somewhat smaller than the pipe in which it will be ultimately installed. In such a case it is desirable that the plug be comparatively small initially and expand later once within the pipe. A standard approach, therefore, is to use an inflatable ball or cylinder plug, which is collapsed initially and inflated once installed. Examples of such inflatable plugs are those disclosed in the Van der Lans U.S. Pat. No. 4,079,755 and the Riegel, et al. U.S. Pat. No. 3,842,864.

Of course, it is necessary for the plug, once installed and inflated, to be stable and effect a firm, immovable seal. A problem with conventional inflatable ball or cylinder plugs is that their axial length must generally be equal to or greater than their diameters in order to effect such a seal. As a consequence, it is frequently impractical to use such plugs when bends in the piping or other interference require a relatively short, maneuverable plug. When several plugs are used in series for added protection, the problem becomes even more acute. Special reinforcing or special installation equipment add to the cost of an inflatable plug and may interfere with its maneuverability.

SUMMARY OF THE INVENTION

The problem is effectively solved by the novel inflatable plug of the present invention, which expands to form a rigid stable seal with a minimum axial length. The fundamental inventive concept is embodied in a plug comprising an inflatable body having a plurality of flexible, inelastic connectors, such as threads, connecting spaced, chamber-forming walls. The threads are secured in a finely distributed pattern over the entire surfaces of the chamber-forming walls, and their effect is to prevent the separation of the walls, upon inflation of the plug body, beyond the length of the threads. The plug is thereby inflatable to an effectively rigid shape without the use of rigid elements that would hinder the plugs's insertion into the pipe. Prior to inflation, the plug of the invention is soft and "floppy" and easily manipulated into position.

The plug body may be manufactured in any shape or size with a closed surface, i.e., a surface with no openings, so that it will be air tight for inflation. When the threads have a uniform length and are relatively short, the inflated plug body is formed into a disc or ellipsoidal shape with minimal axial length. Previous inflatable plugs of the ball or cylinder type do not provide this advantage. The plug body may alternatively be constrained to a toroidal (doughnut) shape when appropriate, as in the large plug assembly described herein.

A suitable material for the construction of the novel lug of the present invention is known in the industry as "drop stitch" or "pile" fabric. This type of fabric has previously been used for flexible structures, but not in the manner of the present invention. Here its use provides a ready method for the effective and economical construction of the rigid, stable seal.

A preferred embodiment of the present invention concept is found in the plug assembly illustrated in the drawings discussed in detail below. This plug assembly utilizes three inflatable disc seal elements having the novel construction of the present invention mounted in series on a support platform and provided with a fail-safe inflation system. The three seals are toroidal, with an elliptical segment cross section, held rigid and stable by internal thread connectors. The inflation system extends through the central apertures to each of the disc seals. Around the periphery of each disc seal is a separate inflatable ring seal, which expands radially to meet the pipe wall in sealing contact. The entire assembly is floppy and readily insertable. Redundancy is provided when two or more disc seals are placed in a series, affording fail-safe protection in a relatively limited space. Conventional ball or cylinder plugs in series would extend over a significantly greater space, with a consequent reduction in maneuverability.

A fully detailed discussion of the preferred embodiment appears below. Reference should be made to the included drawings for a complete understanding of the novel plug of the invention.

BRIEF DESCRIPTION OF THE DRAWINGS

FIG. 3 is a longitudinal cross-sectional view, being an enlarged portion of the view of FIG. 1, showing one of the seal elements in place within the pipe and partially inflated.

FIG. 4 is a further view of that portion shown in FIG. 3, wherein the seal element and surrounding ring seal are fully inflated to create tight sealing contact with the pipe.

DETAILED DESCRIPTION OF THE INVENTION

Figure 1:
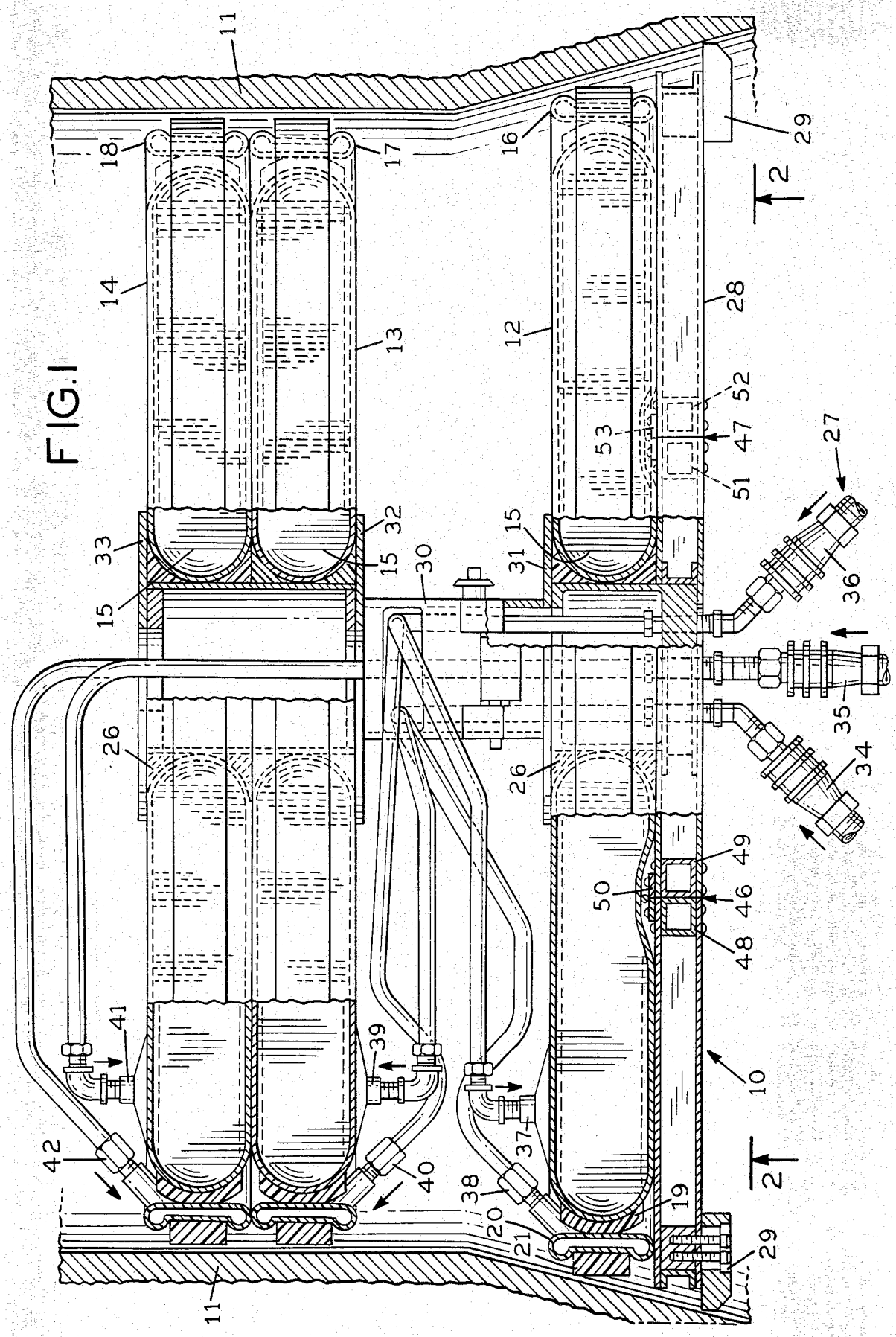
FIG. 1 is a longitudinal elevational view, partly in cross-section, of a preferred embodiment of the novel plug of the invention, showing three disc seal elements in series mounted on a support platform, with a fail-safe inflation system.

FIG. 1 shows a complete plug assembly 10 inserted into the narrowing aperture of a large pipe 11. The plug assembly 10 has three annular disc seals 12–14 which each embody the central inventive concept of the present invention. Each is made of a flexible impermeable material and constrained to an elliptcal sector cross-section when inflated by finely distributed flexible inelastic connector elements or threads 15 which extend from one opposed wall to the other through the cavity of the hollow plug. FIGS. 1 and 3 show the fine distribution of threads as they pass through the cavity of the hollow plug and are secured to the opposed walls. Because the walls of the disc seals 12–14 and the threads 15 are flexible, the uninflated disc seal will be "floppy", i.e., non-rigid and easily manipulable. Because the threads 15 are relatively inelastic, the disc seal will not expand into a ball shape when inflated, but instead will form a rigid flat annulus of minimal axial length.

The material of the disc seals 12–14 may advantageously be nylon woven fabric coated with neoprene rubber. The threads 15, also nylon, are woven in a drop stitch or pile pattern. A particularly advantageous and appropriate material would be 400p Nylon "Infab" (trademark), manufactured by U.S. Plush Mills, Pawtucket, R.I. (meeting military specification No. Mil-C-17415 E). Another impermeable material that is sufficiently strong and flexible may be substituted. It will be understood that a significant aspect of the inventive concept, as embodied here, resides in the provision of finely distributed, relatively inelastic connecting threads 15, not in the particular weave or manufacture of the material, and the use of a variety of materials having this general construction is intended to be included within the scope of the claims.

To ensure tight sealing contact with the interior surface of the pipe 11, annular ring seals 16–18 are mounted on the exterior side walls of the disc seals 12–14, respectively. An example of an advantageous ring seal, as illustrated here, is constructed from nylon fabric reinforced neoprene, and is manufactured by The Presray Corporation, Pawling, N.Y. The ring seal 16, which is identical to ring seals 17 and 18 except for being larger in diameter, has three elements: a mounting element 19, an inflatable element 20, and a sealing element 21. These elements are seen in enlarged views in FIGS. 3 and 4.

FIG. 3 is an enlarged partial section of the plug assembly 10 of FIG. 1. The illustrated disc seal 16 has been inflated to the point where it has assumed an elliptical shaped sector cross-section, and the threads 15 are fully extended to run through the cavity of the plug and rectilinear, except the threads 22, 23 closest to the rounded side wall portions 24, 25. The mounting element 19 is affixed to the side wall portion 24. The annular inflatable element 20 is uninflated in FIG. 3, and the sealing element 21 is not in contact with the pipe 11. At this stage, the plug assembly 10 may easily be maneuvered into place in the pipe 11.

In FIG. 4, both the disc seal 12 and the inflatable element 20 are fully inflated. The side wall portion 25 has expanded to fit almost completely into the rigid support frame and urethane gasket 26, which will be more fully discussed below. The threads 23 are now rectilinear. The side wall portion 25 now forms a leak-tight seal with the support frame 26. The side wall 24 assumes a radius and it conforms with the rounded surface of the mounting element 19.

When the inflatable element 20 is fully inflated, it presses the outer surface of the sealing element 21 against the inner surface of the pipe 11 to form an extended leak-tight sealing contact. As illustrated in the drawings, the plug assembly 10 has been inserted into a narrowing pipe 11, so that the second two ring seals 17, 18 meet the pipe 11 straight on, while the first disc seal 12 meets the pipe 11 at an angle. When installed in a pipe, this first disc seal 12 is usually uppermost. FIG. 4 illustrates how the inflatable element 20 can expand asymmetrically to press the sealing element 21 fully against the wall of the pipe 11. Thus each disc seal/ring seal unit makes an effective individual sealing contact, and in series they form a fail-safe combination. The fail-safe properties are enhanced by the inflation system specially provided in the preferred embodiment.

An example of an appropriate support frame and inflation system 27 is shown in FIG. 1. Although FIG. 1 shows the first disc seal 12 as the lowest seal, frequently and advantageously the seal assembly will be inserted with the first disc seal 12 uppermost, and the discussion herein will so refer to it. Above the first disc seal 12 is a rigid platform 28. The platform 28 is primarily to support the weight of a man while working, and to prevent dropped tools from damaging the seals. The platform 28 may be designed advantageously to have a greater diameter than that of the narrowest part of the pipe 11, so that the outer rim 29 of the platform acts as a mechanical block to prevent the entire plug assembly 10 from passing into the pipe 11, before the seals are inflated or in the unlikely event that all the seals fail.

Figure 2:
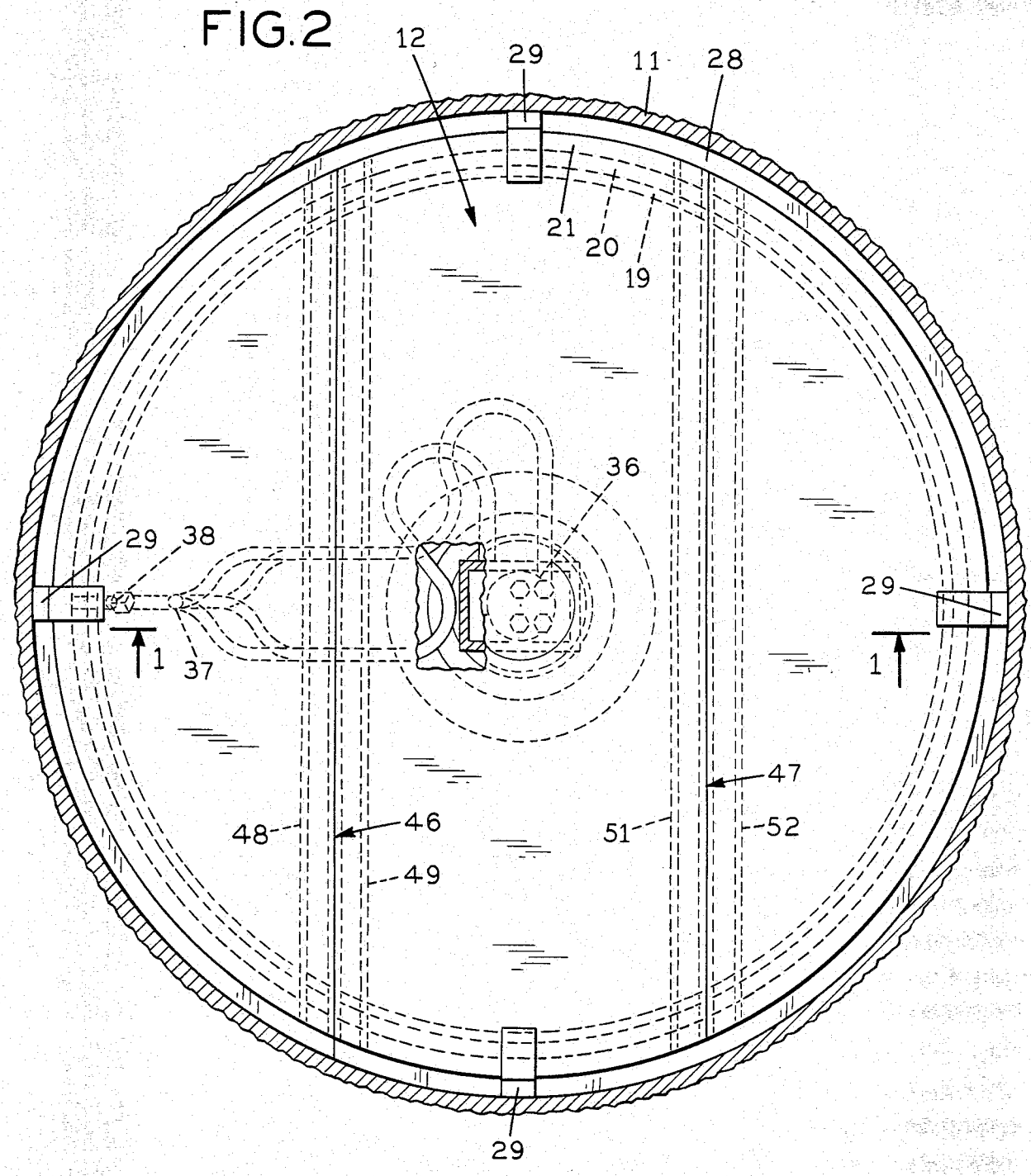
FIG. 2 is an axial cross-section view, taken along line 2—2 in FIG. 1, showing the support platform and inflation system.
Figure 5:
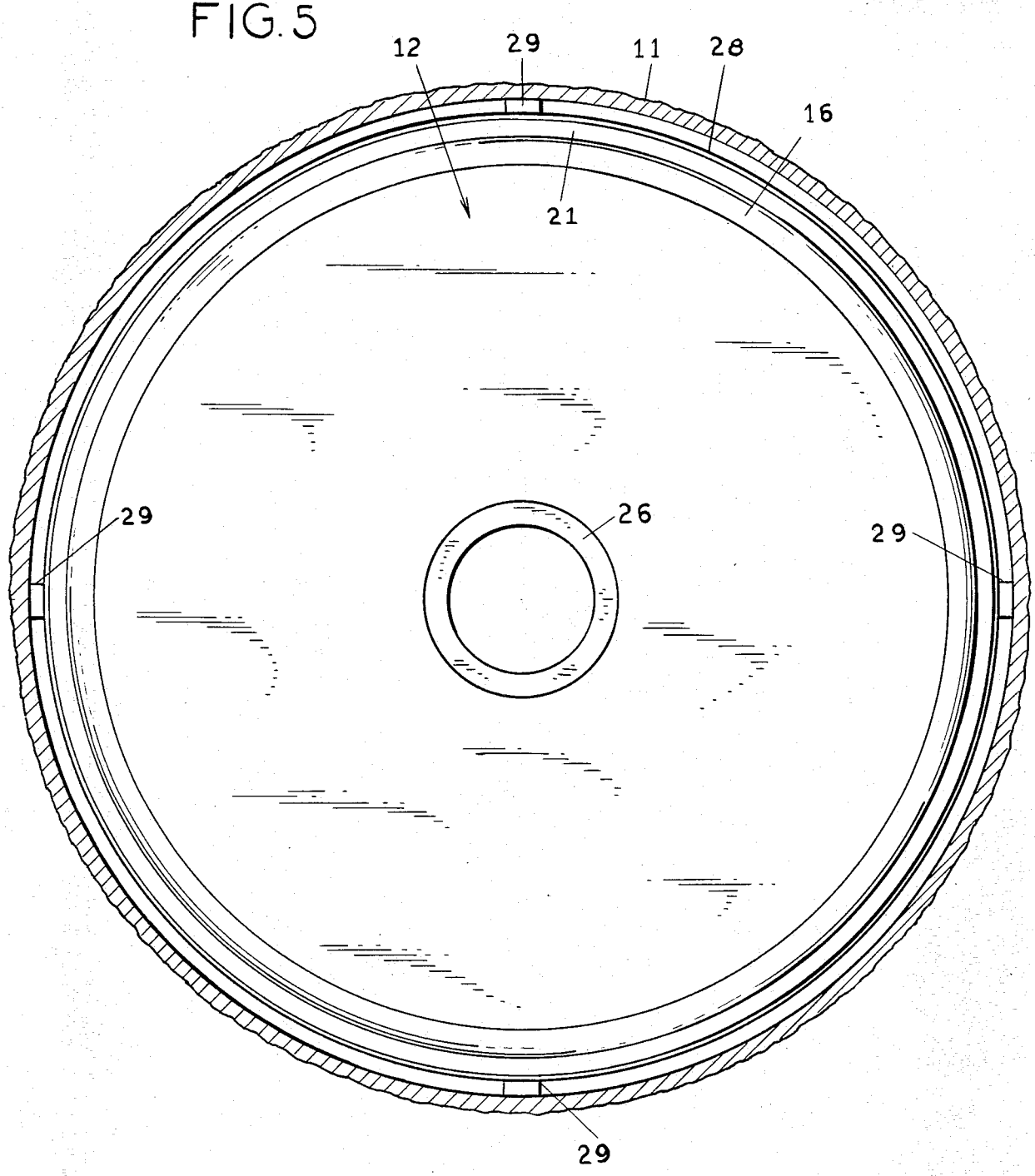
FIG. 5 is a top plan view of the novel plug assembly, showing a toroidal plug.

In order to allow the platform to be manipulated easily through manways, the platform 28 is hinged along two parallel axes 46 and 47. Bracing supports 48 and 49 along axis 46 support the platform 28 when it is fully extended flat, and hinge 50 allows the platform 28 to fold. Similar structure, i.e., bracing supports 51, 52 and hinge 53, allow the platform 28 to fold along axis 47. This is shown in FIG. 2. The disc seal 12 adapts its contour to fit tightly over hinges 50, 53.

Extending from the platform 28 and supporting the second two disc seals 13, 14 is a rigid hollow support column 30 which passes through the central apertures of all three disc seals 12–14, and from which annular bracing flanges 31–33 extend on top and bottom of the disc seals. The support flanges 31–33 have diameters significantly smaller than those of the disc seals, so that the uninflated plug assembly 10 will be narrow and floppy. The support frame comprising platform 28, support column 30 and bracing flanges 31–33, supplies the rigid skeleton of the plug assembly against which the disc seals are braced. It will be understood, of course, that the particular rigid support frame may appear in many forms without departing from the scope of the claims, provided that the support frame acts as a brace for the seals which being narrow enough to be maneuvered easily through the pipes.

The inflation system 27, as illustrated in the preferred embodiment, has six separate air lines to inflate individually the three disc seals 12–14 and the three ring seals 16–18. In FIG. 1, this inflation system 27 is shown semi-schematically, in that only three external nozzles 34–36 are shown while the six internal discharge fittings 37–42 are shown. The six connecting reinforced hoses, 43–45 as shown, pass through the hollow support tree 30 and out to the internal discharge fittings 37–42.

The six separate air lines make the plug assembly 10 virtually fail safe. Again, it will be understood that many variations in the exact arrangement and numbers of the air lines will be included within the scope of the claims.

The practical advantages of the novel plug of the present invention lie in its amazing effectiveness combined with its design simplicity. Many costly and cumbersome features of the conventional inflatable plugs, once necessary to provide rigidity, stability and maneuverability, are no longer required. The basic plug is flexible before inflation, rigid afterwards, stable and effective. The plug assembly is a fail-safe, eminently practical seal.

To understand fully the inventive concept and embodiments disclosed in this application, reference should be made to the following claims.

I claim:

1. An inflatable plug for interrupting fluid flow in a pipe, comprising
   (a) a substantially hollow, inflatable plug body;
   (b) said plug body being formed from first and second opposed walls defining a cavity-forming chamber between them;
   (c) said walls being formed from a flexible, impermeable material,
   (d) said plug body having a closed surface;
   (e) a plurality of thread-like, flexible, generally inelastic connector elements, each secured at one end to said first wall and at the other end to said second wall and extending generally perpendicular to said walls through the cavity of the chamber formed between said walls;
   (f) said ends of said connector elements being secured to said walls in a finely distributed pattern over substantially the entire surfaces of the walls;
   (g) whereby said connector elements prevent the walls of the plug body, when inflated, from separating from each other a distance greater than the length of said connector elements;
   (h) an inflatable annular ring seal of flexible, impermeable material being affixed to and extending circumferencially around said hollow, inflatable plug body;
   (i) said ring seal, when inflated, being arranged and configured to be in a leak tight sealing contact with the interior wall of the pipe, and
   (j) an inflation system connected to each of said hollow, inflatable plug body and said inflatable ring seal;
   (k) said inflation system being operable to selectively, individually inflate and deflate each of said plug body and said ring seal.

2. An inflatable plug according to claim 1, wherein said connector elements are generally of the same length.

3. An inflatable plug according to claim 1, wherein
   (a) said connector elements are short relative to the dimensions of said opposed walls in a direction transverse to said connector elements,
   (b) whereby said plug body, when inflated, will have a minimal separation between said opposed walls.

4. An inflatable plug according to claim 1, wherein the inflatable plug body is of ellipsoidal shape.

5. An inflatable plug according to claim 1, wherein the inflatable plug body is toroidal.

6. An inflatable plug assembly, comprising
   (a) at least two inflatable plugs according to claim 1 arranged in an axially spaced relation, and
   (b) a rigid support skeleton arranged to support said inflatable plugs.

7. An inflatable plug assembly, which comprises
   (a) a plurality of inflatable plug bodies arranged in an axially spaced relation,
   (b) each of said plug bodies comprising:
      (i) a substantially hollow, inflatable plug body;
      (ii) said plug body being formed from first and second opposed walls defining a cavity-forming chamber between them;
      (iii) said walls being formed from a flexible; impermeable material;
      (iv) said plug body having a closed surface;
      (v) a plurality of thread-like, flexible, generally inelastic connector elements, each secured at one end to said first wall and at the other end to said second wall and extending generally perpendicular to said walls through the cavity of the chamber formed between said walls;
      (vi) said ends of said connector elements being secured to said walls in a finely distributed pattern over substantially the entire surfaces of the walls;
      (vii) whereby said connector elements prevent the walls of the plug body, when inflated, from separating from each other a distance greater than the length of said connector elements,
   (c) a rigid circular support platform arranged and configured to support at least one of said plug bodies,
   (d) said platform being divided into a plurality of sections along axes parallel to a diameter of said platform,
   (e) said sections being hinged together along said axes,
   (f) said platform having an expanded configuration in which all of said sections are co-planer and form a complete circle, and
   (g) said platform having a plurality of configurations in which the plurality of said sections are rotated with respect to each other about said axes.

8. An inflatable plug assembly, which comprises
   (a) a substantially hollow, inflatable plug body,
   (b) said plug body being formed from first and second opposed walls defining a cavity-forming chamber between them and having a closed surface,
   (c) said walls being formed from a flexible, impermeable material,
   (d) a rigid support platform arranged and configured to provide a co-planar, flat support surface for said inflatable plug body,
   (e) said support platform comprising a plurality of sections rotatably hinged to one another by hinged connections,
   (f) said plurality of hinged sections having an expanded configuration in which all of said sections are co-planar, to provide said co-planar, flat support surface, and
   (g) said plurality of hinged sections having a plurality of additional configurations in which the plurality of said sections are rotated with respect to one another about said hinged connections whereby said support platform is selectively collapsible to a non-co-planar configuration to minimize the dimensions of the plug assembly.

9. The inflatable plug assembly according to claim 8, further characterized by
   (a) an inflatable annular ring seal of flexible, impermeable material being affixed to and extending circumferencially around said substantially hollow, inflatable plug body,
   (b) an inflation system connected to each of said substantially hollow inflatable plug body and said inflatable ring seal,
   (c) said inflation system being operable to selectively, individually inflate and deflate each of said plug body and said ring seal.

10. An inflatable plug assembly, which comprises
   (a) a substantially hollow, inflatable plug body,
   (b) said plug body being formed from first and second opposed walls defining a cavity-forming chamber between them and having a closed surface,
   (c) said walls being formed from a flexible, impermeable material, (d) a rigid support platform arranged and configured to provide a support surface for said inflatable plug body,
(e) said support platform comprising a plurality of sections rotatably hinged to one another by hinged connections,
(f) said plurality of hinged sections having an expanded configuration in which all of said sections are co-planar, to provide said support surface, and
(g) said plurality of hinged sections having a plurality of additional configurations in which the plurality of said sections are rotated with respect to one another about said hinged connections whereby said support platform is selectively collapsible to minimize the dimensions of the plug assembly,
(h) a plurality of thread-like, flexible, generally inelastic connector elements, each secured at one end to said first wall and at the other end to said second wall and extending generally perpendicular to said walls through the cavity of the chamber formed between said walls,
(i) said ends of said connector elements being secured to said walls in a finely distributed pattern over substantially the entire surface of the walls,
(j) whereby said connector elements prevent the walls of the plug body, when inflated, from separating from each other a distance greater than the length of said connector elements.

* * * * *